US006847806B2

(12) United States Patent
Curtis et al.

(10) Patent No.: US 6,847,806 B2
(45) Date of Patent: Jan. 25, 2005

(54) RADIOTELEPHONE

(75) Inventors: Alastair Curtis, Woodland Hils, CA (US); Bent Ole Poulsen, Olstykke (DK); Michael McKay, Frederiksberg (DK); Morten Pontoppidan, Greve (DK); Claus Nicolaisen, Frederiksberg (DK); Gert Plenge, Olstykke (DK); Jakob Kristensen, Olstykke (DK); Anne Primdahl, Hilleroed (DK); Jesper Andersen, Copenhagen (DK); Allan Moeller Kristensen, Copenhagen (DK)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 10/447,643

(22) Filed: May 29, 2003

(65) Prior Publication Data

US 2003/0194974 A1 Oct. 16, 2003

Related U.S. Application Data

(62) Division of application No. 09/503,595, filed on Feb. 11, 2000, now Pat. No. 6,594,472.

(51) Int. Cl.[7] ................................................ H04B 1/38
(52) U.S. Cl. .................. 455/90.3; 455/90.1; 455/575.1; 455/569.1; 455/550.1; 379/433.01; 379/433.11; 379/428.01; 379/433.13
(58) Field of Search ............................ 455/90.1, 575.1, 455/550.1, 569.1; 379/433.13, 433.12, 428.01, 428.02, 432, 434, 433.01, 433.11

(56) References Cited

U.S. PATENT DOCUMENTS

| | | | | |
|---|---|---|---|---|
| 5,335,273 A | * | 8/1994 | Takagi et al. | 379/433.13 |
| 5,493,690 A | * | 2/1996 | Shimazaki | 379/63 |
| 5,548,824 A | * | 8/1996 | Inubushi et al. | 455/90 |
| 5,604,050 A | * | 2/1997 | Brunette et al. | 429/97 |
| 5,659,888 A | * | 8/1997 | Kato et al. | 455/575 |
| 5,706,332 A | * | 1/1998 | Nagai | 379/58 |
| 5,745,566 A | * | 4/1998 | Petrella et al. | 379/433.13 |
| 5,933,330 A | * | 8/1999 | Beutler et al. | 361/814 |
| 5,982,881 A | * | 11/1999 | Mischenko | 379/433.11 |
| 6,151,486 A | * | 11/2000 | Holshouser et al. | 455/575.3 |
| 6,463,262 B1 | * | 10/2002 | Johnson et al. | 455/90.1 |
| 6,487,397 B2 | * | 11/2002 | Fuhrmann et al. | 455/90.1 |

* cited by examiner

*Primary Examiner*—Marceau Milord
(74) *Attorney, Agent, or Firm*—Steven A. Shaw

(57) ABSTRACT

An electronic radiotelephone comprising a first housing, a second housing, and an inner housing having retaining means for retaining to the inner housing the electronic components of the radiotelephone; and first releasable attaching means for releasable attaching the first housing to the inner housing, wherein the first housing, when attached to the inner housing, is presented towards a user during operation of the radiotelephone; and second releasably attaching means for releasable attaching the second housing to the inner housing, wherein the second housing, when attached to the inner housing, faces away from the user during operation of the radiotelephone.

14 Claims, 4 Drawing Sheets

RADIOTELEPHONE

CROSS-REFERENCE TO RELATED APPLICATIONS

This application is a Divisional of and claims priority under 35 U.S.C. 120 to U.S. Ser. No. 09/503,595; filed on Feb. 11, 2000, now U.S. Pat. No. 6,594,472 which claims priority under 35 U.S.C. 119 to UK Patent Application Number 9903260.9 filed on Dec. 2, 1999.

TECHNICAL FIELD OF THE INVENTION

This invention relates to a radiotelephone.

BACKGROUND OF THE INVENTION

It has become desirable for users of radiotelephones to replace a broken or scratched housing of the radiotelephone easily without requiring any special training or tools. Also, users of radiotelephones may want to change the appearance of their radiotelephone by replacing its housing with another of a different appearance. While it is known to replace a front cover of a radiotelephone this only allows a user to replace a broken or scratched front cover or change the appearance of the front of the radiotelephone, not the overall appearance.

Typically, the front and rear housings of a radiotelephone retain the internal components of the radiotelephone. Therefore, the removal of the front and rear housings can result in the internal components of the phone becoming loose and/or exposed thereby increasing the risk of the components being damaged. Further, while the appearance of the radiotelephone battery, which is typically attached to the rear housing of the radiotelephone, can be modified to match that of the front cover the battery only covers a portion of the rear housing of the radiotelephone. Further, as a battery is a renewable item and may require to be changed separately to the front cover this would require suppliers to increase stocks of batteries to cover the range of different appearances or for a customer to wait while the battery is being manufactured and delivered.

SUMMARY OF THE INVENTION

In accordance with a first aspect of the present invention there is provided An electronic radiotelephone comprising a first housing, a second housing, and an inner housing having retaining means for retaining to the inner housing the electronic components of the radiotelephone; and first releasably attaching means for releasably attaching the first housing to the inner housing, wherein the first housing, when attached to the inner housing, is presented towards a user during operation of the radiotelephone; and second releasably attaching means for releasably attaching the second housing to the inner housing, wherein the second housing, when attached to the inner housing, faces away from the user during operation of the radiotelephone.

The present invention provides the advantage that a user is able to replace a broken or damaged front and rear cover or change the overall appearance of the radiotelephone without increasing the risk of the radiotelephone components being damaged and without the need for manufacture's to produce a variety of batteries of different appearance for the same type of radiotelephone.

Preferably the inner housing has an external surface to allow a user to grip the inner housing to aid the releasing and/or attaching of the first or second housing from/to the inner housing.

This provides the advantage that a user is able to grip the radiotelephone sufficiently to allow removal of the first and second housings. The grip area preferably comprises an area on each side of the radiotelephone sized to allow a user's finger and thumb to firmly grip the radiotelephone.

Preferably the first attaching means includes a latching member disposed on the first housing for engagement with a complementary latching member disposed on the inner housing.

Suitably the latching member disposed on the first housing is a lug formed on a resilient part of the first housing and the complementary latching member on the inner housing is a slot to allow the first housing to be push-fitted onto the first housing.

Preferably the second attachment means includes a latching member disposed on the second housing for engagement with a complementary latching member disposed on the inner housing.

Suitably the second attachment means allows the second housing and the inner housing to be slidably coupled.

Preferably the first and second housings have interlocking means which are arranged to interlock the first and second housings when the first and second housings are attached to the inner housing. This provides extra stability to the construction of the radiotelephone.

Preferably the second housing overlays a battery retained by the inner housing, thereby concealing the battery when the second housing is attached.

In accordance with a second aspect of the present invention there is provided a first housing and second housing for an inner electronic radiotelephone housing having retaining means for retaining to the inner housing the electronic components of the radiotelephone, the first housing and second housing having releasable attaching means for releasable attaching to the inner housing so that the first housing is presented to a user during operation of the radiotelephone when the first housing is releasable attached to the inner housing and the second housing faces away from the user during operation of the radiotelephone when the second housing is releasable attached to the inner housing.

In accordance with a further aspect of the present invention there is provided set of exchangeable cover parts for enclosing a radiotelephone body containing the electronic components of the radiotelephone, said set of exchangeable cover parts includes an exchangeable front cover and an exchangeable rear cover, a first one of said set of exchangeable cover parts includes first locking means in a first end of said of first cover part for engaging the a lower end of the radiophone body in order to guide said of first cover part in a pivotal movement when attached to the radiophone body, and second locking means in the end opposite to the first end for engaging the upper portion of the radiophone body by means of a snap-on connection, a second one of said set of exchangeable cover parts for being slidable coupled to the first cover part when placed on the radiophone body, said second cover part includes third locking means for in the upper end of said second cover part for engaging said second locking means of the first cover part in order to prohibit a release of said snap-on connection when the set of exchangeable cover parts are assembled with the radiophone body sandwiched in between, fourth locking means for in the lower end of said second cover part for engaging said first locking means of the first cover part in order to prohibit a release said engagement when the set of exchangeable cover parts are assembled with the radiophone body sandwiched in between, and fifth locking means for interacting with locking means on the radiophone body in order to block the slidability of the second cover part relatively to the first cover part when placed on the radiophone body, and said fifth locking means are releasably by means of a user operated release button.

For a better understanding of the present invention and to understand how the same may be brought into effect reference will now be made, by way of example only, to accompanying drawings, in which:

DETAILED DESCRIPTION OF THE DRAWINGS

Figure 1:
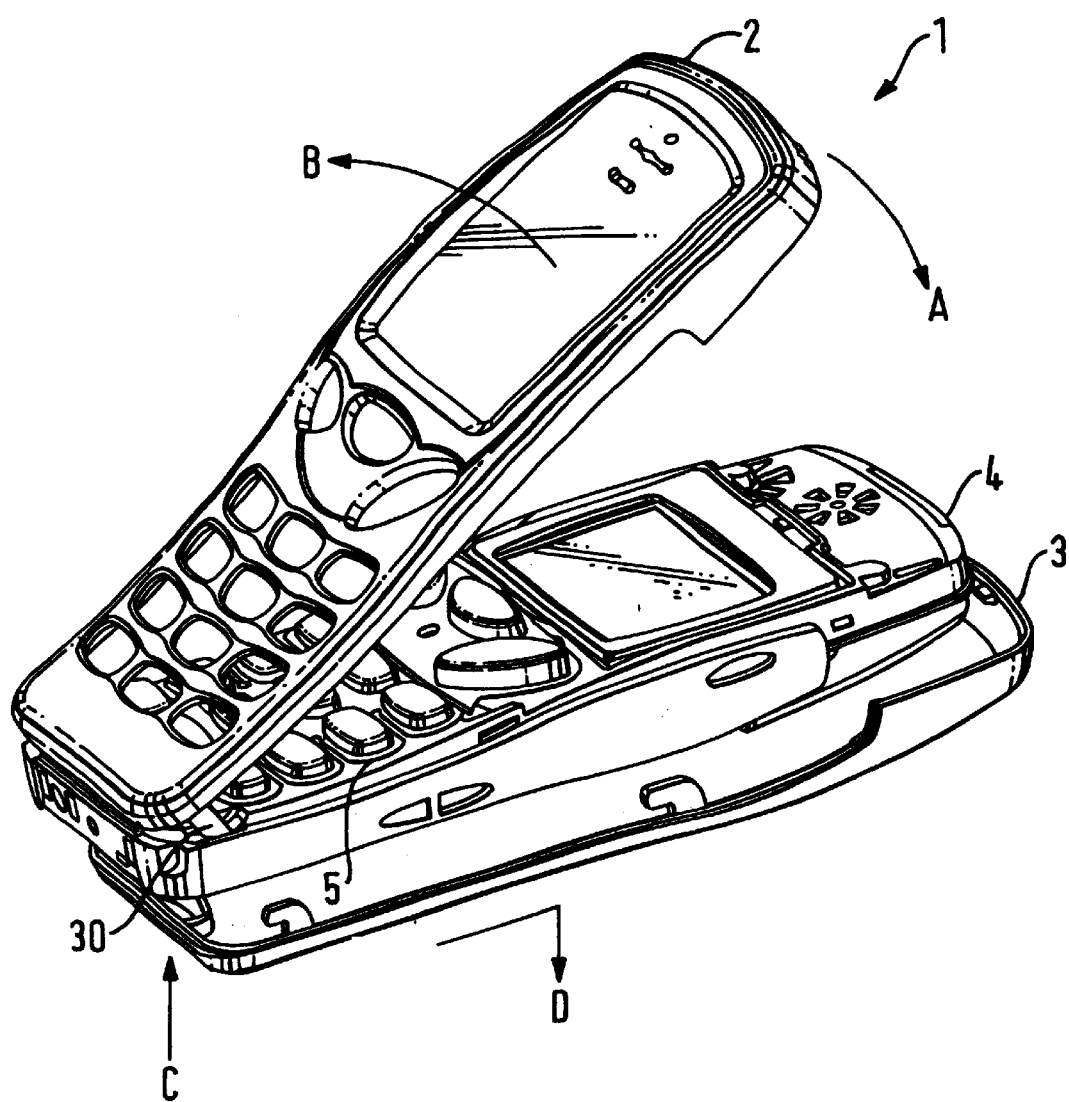
FIG. 1 shows a radiotelephone according to an embodiment of the present invention.

FIG. 1 shows a radiotelephone 1 having a first housing 2, otherwise referred to as a front cover, a second housing 3, otherwise referred to as a rear cover, and an inner housing 4. Sandwiched between the front cover 2 and inner housing 4 is a keymat 5. The front cover 2 is preferably made of a resilient material, for example polyarylamid.

In this embodiment, the front cover 2 is releasably attachable to the upper portion of the inner housing 4 by means of a snap-on connection, while the rear cover 3 is releasably attachable to the lower portion of the inner housing 4 by means of a slidable coupling. This will be described in detail below. However, other forms of attachment may be used, for example the front cover can be attached by means of a slidable coupling.

Figure 2:
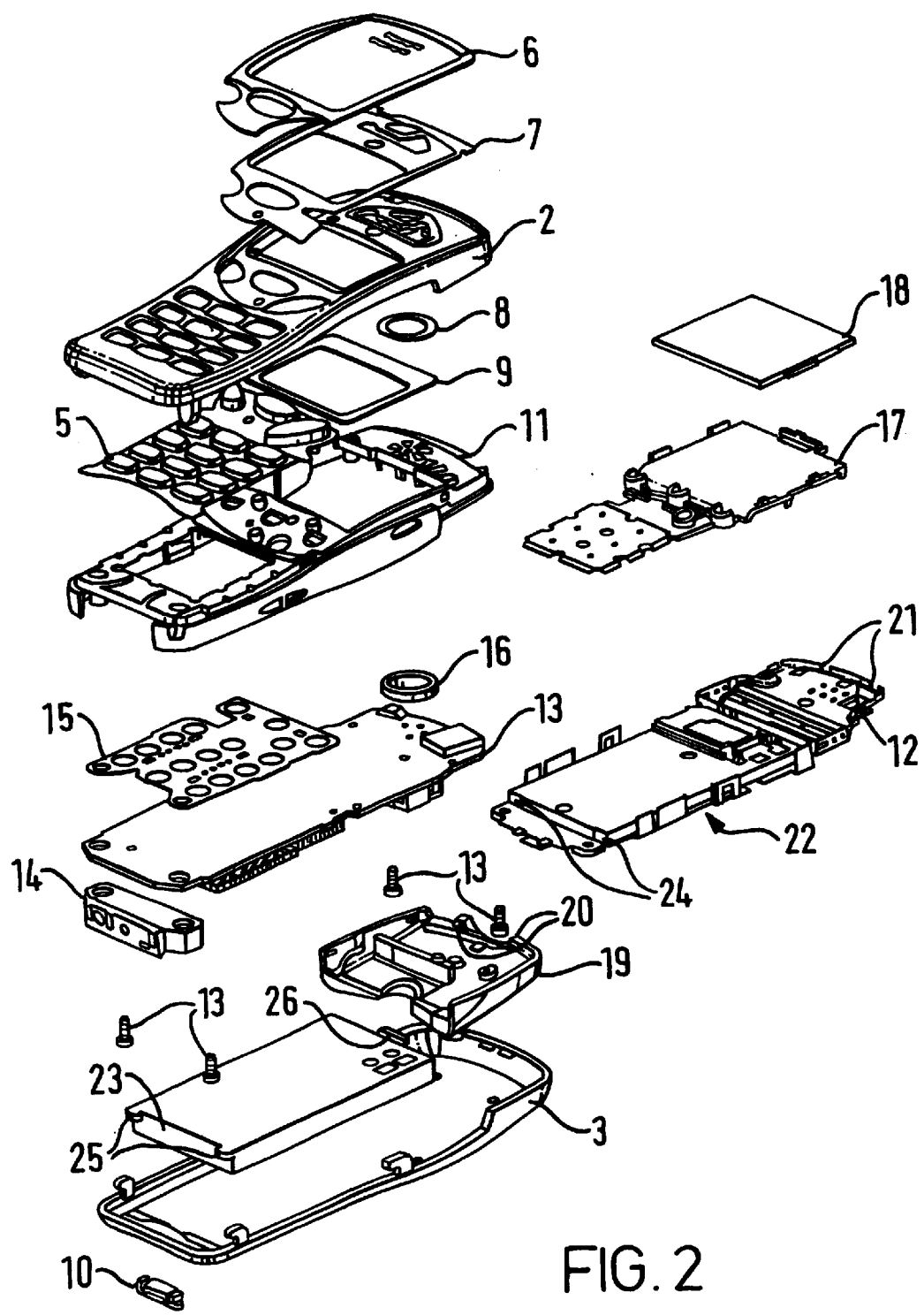
FIG. 2 shows an exploded view of the radiotelephone of FIG. 1.

FIG. 2 shows the mechanical structure of the radiotelephone 1. The front cover 2 includes a bezel window 6, which is attached to the front cover 2 by means of adhesive 7. Secured to the underside of the main cover 6 is a speaker gasket 8 and LCD dust seal 9. The keymat 5 is snapped on and off the inner side of the main front cover 6. The main purpose of the keymat 5 is to act as an interface between the user and the functions of the radiotelephone. The rear cover 3 includes a release button 10. The inner housing 4 comprises an upper cover 11 and a lower cover 12 which are coupled together by means of screws 13. Retained between the upper cover 11 and lower cover 12 is the main circuit board 13 for providing the main functionality of the radiotelephone, a system connector 14, a dome sheet 15 which transforms the movements of the keys into an electrical connection on the circuit board, a speaker 16, a light guide 17 and a liquid crystal display (LCD) 18.

An internal antenna 19 is mounted to the outer surface of the lower cover 12 by two hooks 20 that mate with two slots 21 on the lower cover 12.

The lower cover 12 has a recess 22 to accommodate battery 23. Located on the bottom edge of the recess 22 are two slots 24 into which are located two lugs 25 on the bottom portion of battery 23. The top portion of battery 23 has a resilient element 26 that engages with a slot on the top edge of the recess 22 to secure battery 23 to inner housing 4.

Figure 3:
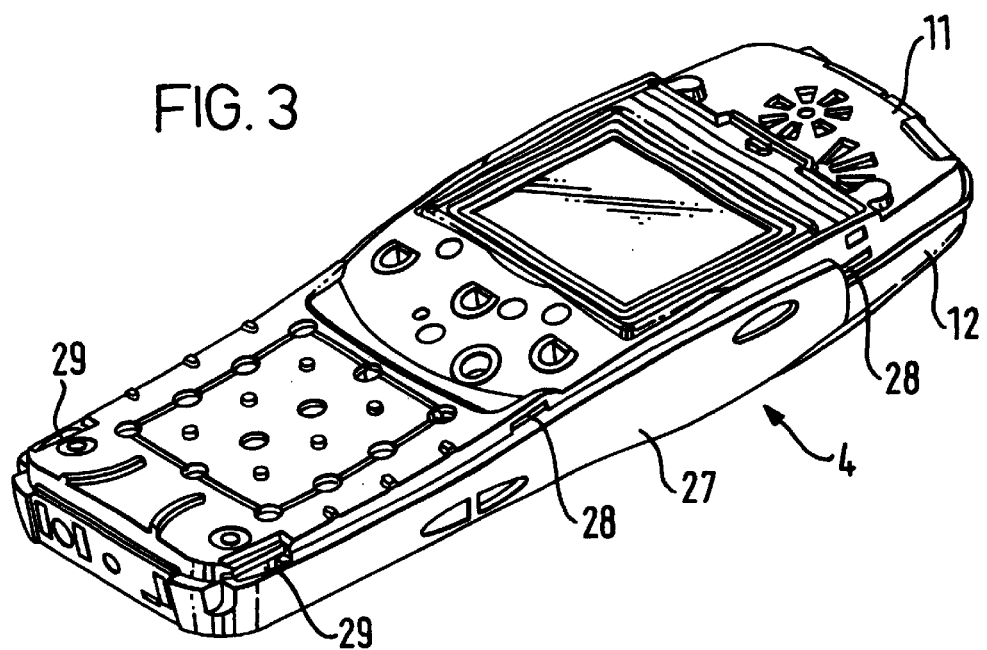
FIG. 3 shows the inner housing of the radiotelephone of FIG. 1.

FIG. 3 shows a top perspective view of the inner housing 4. A section 27 of the side wall projects laterally outward by a constant distance and provides an area for gripping the radiotelephone 1 while the front cover 2 or rear cover 3 is being removed or attached, as described below. The grip area 27 on each side of the radiotelephone is sized to allow a user's finger and thumb to firmly grip the radiotelephone. On the narrow section of each side wall are provided two slots 28.

On the bottom portion of the inner housing 4 are provided two channels 29 that extend through the inner housing 4 from the upper cover 11 through the lower cover 12.

The wall elements of the front cover 2 have substantially the same contour as the upper surface of the outer wall section 27 of the inner housing 4 and are designed so that front cover 2 and inner housing 4 can be fit snugly together.

Figure 4:
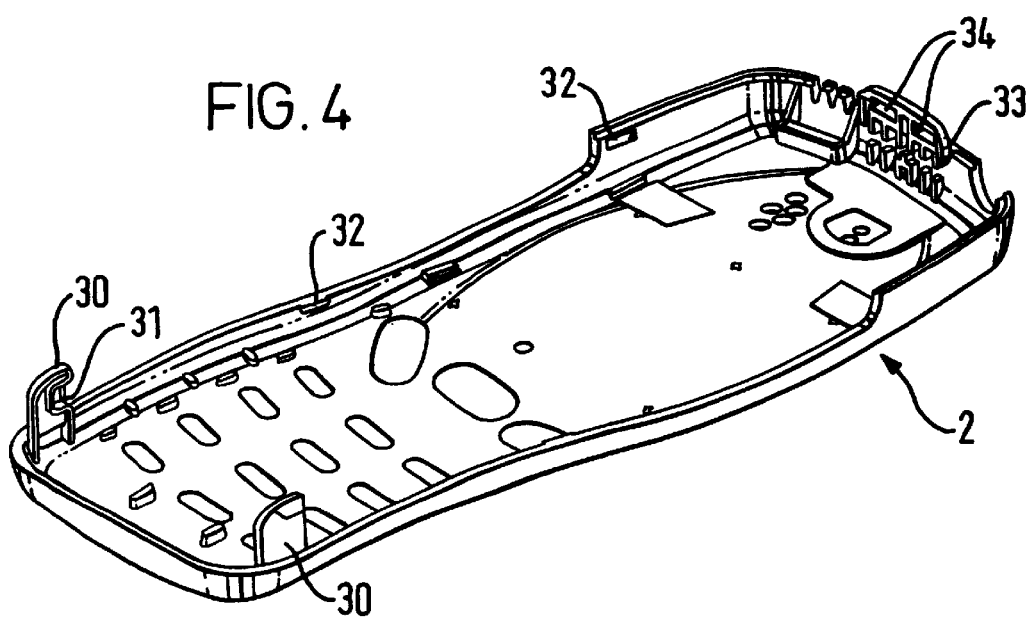
FIG. 4 shows the first housing of the radiotelephone of FIG. 1.

The front cover 2 has two attachment lugs 30 on the bottom portion of the cover 2. Each lug 30 has a channel 31, as shown in FIG. 4.

On each inner wall of the front cover 2 are located two attachment lugs 32, one lug located towards the upper region of the cover 2 the other one located in the central region of the cover 2. On the upper portion of front cover is provided an attachment element 33 extending away from the rear surface. The attachment element 33 has two apertures 34.

To attach the front cover 2 to the inner housing 4 the attachment lugs 30 are inserted into the lower channels 29 as shown in FIG. 1. The cover is then moved in direction A until lugs 32 abut the upper surface of the narrow section of the inner housing 4 positioned above corresponding slots 28. The front cover 2 is then urged towards the inner housing 4. The front cover 2 is preferably made of a resilient material, thereby allowing a user to easily urge the lugs 32 over the upper surface of the inner housing 4 allowing the front cover lugs 32 to snap fit into the corresponding slots 28 on the inner housing 4. Preferably a user holds/grips the grip area 27 when attaching the front cover 2. To remove the front cover 2 from the inner housing 4 a user preferably holds/grips the grip area 27 while urging the top section of the front cover 2 away from the inner housing 4. The front cover 2 is then lifted away from the inner housing 4 in direction B, as shown in FIG. 1.

Figure 5:
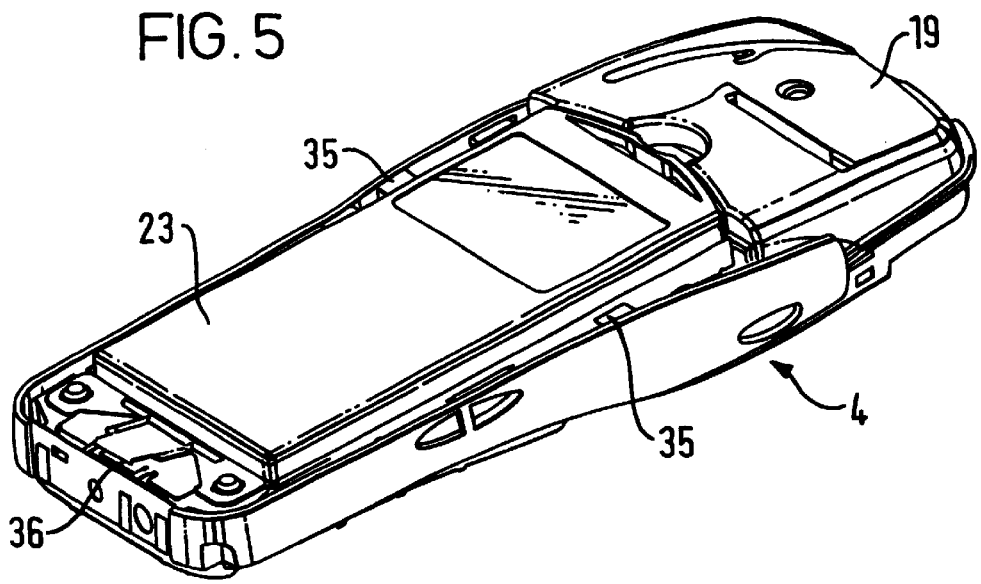
FIG. 5 shows the inner housing of the radiotelephone of FIG. 1.

FIG. 5 shows a bottom perspective view of the inner housing 4 with battery 23 and internal antenna 19 attached. Each side wall of the inner housing 4 has a lug 35 projecting laterally inwards. The bottom portion of the inner housing 4 has a release spring 36 which projects slightly above the upper surface of the side walls.

Figure 6:
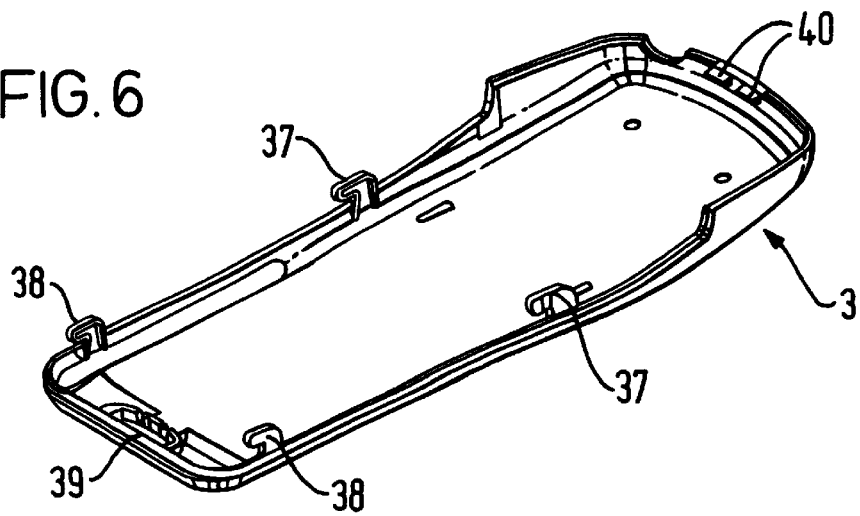
FIG. 6 shows the second housing of the radiotelephone of FIG. 1.

As shown in FIG. 6, the rear cover 3 has a first pair of L shaped attachment lugs 37 provided on the central region of each longitudinal side of the cover and a second pair of L shaped attachment lugs 38 provided on the bottom region of each longitudinal side of the cover. In addition, the rear cover 3 has an aperture 39 for housing release button 10 and two attachment lugs 40 provided at the top section of the rear housing 3.

To attach rear cover 3 to the inner housing 4 the user preferably holds/grips grip area 27 while the rear cover 3 is disposed adjacent to the inner housing 4 positioned such that the upper L shaped lugs 37 are longitudinally separated from lugs 35 on the inner housing 4, as shown in FIG. 1. The rear cover 3 and inner housing 4 are pushed together and the rear cover 3 is slid in the direction of the rear covers longitudinal axis allowing the L shaped lugs 37 to engage the inner housing lugs 35. When the rear cover 3 is attached to the inner housing 4 the spring clip 36 projects within the cavity defined by the inner surface of the rear cover 3. Thereby, once the rear cover has been attached to the inner housing the spring clip 36 prevents the rear cover 3 being slid longitudinally and consequently prevents the removal of the rear cover 3.

If the rear cover 3 is attached to the inner housing 4 when front cover 2 has already been attached the lower L shaped lugs 38 engage with channels 31 formed in the front cover lugs 30. Further, the upper lugs 40 on the rear cover 3 engage with apertures 34 on the front cover, thereby, interlocking the front and rear covers. Thus, the attachment of the rear cover 3 secures the front cover 4 to the inner housing and prevents the removal of the front cover while the rear cover is attached to the inner housing.

To remove the rear cover the radiotelephone is preferably held/gripped in grip area 27 while the release button 10 is depressed in direction C, as shown in FIG. 1, to urge the release spring clip 36 down below the level of the inner housing side walls. This allows the rear cover to be slid longitudinally away in direction D, as shown in FIG. 1.

In view of the foregoing description, it will be evident to a person skilled in the art that various modifications may be made within the scope of the claims. For example the first attaching means allows the first housing and the inner housing to be slidably coupled.

What is claimed is:

1. An electronic radiotelephone comprising:
    a first user exchangeable non-planer cover part for changing the appearance of the radiotelephone wherein the cover part having a plurality of contours;
    a second user exchangeable non-planer cover part for changing the appearance of the radiotelephone;
    an inner housing for retaining and protecting the electronic components of the radio telephone while user is exchanging the user exchangeable non-planer cover parts and the inner housing having contours matching the plurality of contours of the first user exchangeable non-planer cover part so that the first user exchangeable non-planer cover part and the inner housing can fit snugly together;
    first user-releasable attaching means for releasable attaching the first cover part to the inner housing, wherein the first cover part, when attached to the inner housing, is presented towards a user during operation of the radiotelephone; and
    second user-releasable attaching means for releasably attaching the second user exchangeable non-planer cover part to the inner housing, wherein the second user exchangeable non-planer cover part, when attached to the inner housing, faces away from the user during operation of the radiotelephone.

2. A radiotelephone according to claim 1, wherein the inner housing has an external surface to allow a user to grip the inner housing to aid the user in releasing and/or attaching the first or second user exchangeable cover part from/to the inner housing.

3. A radiotelephone according to claim 1 or claim 2, wherein the first attaching means includes a latching member disposed on the first user exchangeable cover part for engagement with a complementary latching member disposed on the inner housing.

4. A radiotelephone according to claim 3, wherein the latching member disposed on the first user exchangeable cover part is a lug formed on a resilient part of the first user exchangeable cover part and the complementary latching member on the inner housing is a slot to allow the first user exchangeable cover part to be push-fitted onto the first user exchangeable cover part.

5. A radiotelephone according to claim 1, wherein the second attaching means includes a latching member disposed on the second user exchangeable cover part for engagement with a complementary latching member disposed on the inner housing.

6. A radiotelephone according to claim 5, wherein the second attaching means allows the second user exchangeable cover part and inner housing to be slidably coupled.

7. A radiotelephone according to claim 1, wherein the first user exchangeable cover part and second user exchangeable cover part have interlocking means which are arranged to interlock the first user exchangeable cover part and second user exchangeable cover part when the first user exchangeable cover part and second user exchangeable cover part are attached to inner housing.

8. A radiotelephone according to claim 1, wherein the first user exchangeable cover part has a user interface, which in use, co-operates with the inner housing to operate the radiotelephone.

9. A radiotelephone according to claim 1, further comprising a key mat mounted within the first user exchangeable cover part, which in use, co-operates with the inner housing to operate the radiotelephone.

10. A radiotelephone according to claim 1, wherein the second user exchangeable cover part overlays a battery retained by the inner housing.

11. A first user exchangeable non-planer cover part having a plurality of contours and a second user exchangeable cover part for an inner electronic radiotelephone housing having a plurality of contours and retaining means for retaining to the inner housing the electronic components of the radiotelephone, the first user exchangeable cover part and the second user exchangeable cover part having releasable attaching means for releasable attaching to the inner housing so that the first user exchangeable cover part is presented to a user during operation of the radiotelephone when the first user exchangeable cover part is releasable attached to the inner housing and the second user exchangeable cover part faces away from the user during operation of the radiotelephone when the second user exchangeable cover part is releasable attached to the inner housing, and wherein the plurality of contours of the first user exchangeable cover match the plurality of contours of the inner electronic radiotelephone housing so that the first user exchangeable non-planer cover part and the inner electronic radiotelephone housing can fit snugly together.

12. An electronic radiotelephone comprising:
    a first user exchangeable cover part having a plurality of contours,
    a second user exchangeable cover part, and
    an inner housing retaining the electronic components of the radiotelephone while user is exchanging the user exchangeable non-planer cover parts and having contours matching the plurality of contours of the first user exchangeable non-planer cover part so that the first user exchangeable non-planer cover part and the inner housing can fit snugly together; and
    first releasable attaching means for releasable attaching the first user exchangeable cover part to the inner housing, wherein the first cover part, when attached to the inner housing, is presented towards a user during operation of the radiotelephone; and
    second releasable attaching means for releasable attaching the second cover part to the inner housing, wherein the second user exchangeable cover part, when attached to the inner housing, faces away from the user during operation of the radiotelephone;

wherein the first and second user exchangeable cover parts have interlocking means which are arranged to interlock the first and second user exchangeable cover parts when the first and second user exchangeable cover parts are attached to the inner housing.

13. The electronic radiotelephone of claim 12, wherein the second user exchangeable cover part has locking means for interacting with locking means on the inner housing in order to lock the second cover part relatively to the inner housing and prohibit a release of the first user exchangeable cover part, and said locking means are releasable by means of a user operated release button.

14. A set of exchangeable cover parts for enclosing a radiotelephone body containing the electronic components of the radiotelephone, said set of user exchangeable cover parts includes:

an user exchangeable front cover and an user exchangeable rear cover, a first one of said set of user exchangeable cover parts includes:

gripping means for interacting with complementary means provided on the radiophone body, and resilient locking means for engaging with complementary locking means provided on the radiophone body, whereby said first one of said set of user exchangeable cover parts may be snapped-on to the radiophone body, said second one of said set of user exchangeable cover parts includes:

gripping means for interacting with complementary means provided on the radiophone body, locking means for engaging said resilient locking means of said first user exchangeable cover part in order to prohibit a release of said snap-on connection when the set of user exchangeable cover parts are assembled with the radiophone body sandwiched in between, and locking and release means for interacting with locking means on the radiophone body in order to block the slidability of said second one of said set of user exchangeable cover parts relatively to the radiophone body, and said locking and release means are releasable by means of a user operated release button.

* * * * *